(12) United States Patent
Baldwin

(10) Patent No.: US 9,241,111 B1
(45) Date of Patent: Jan. 19, 2016

(54) ARRAY OF CAMERAS WITH VARIOUS FOCAL DISTANCES

(71) Applicant: Amazon Technologies, Inc., Reno, NV (US)

(72) Inventor: Leo Benedict Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 13/905,938

(22) Filed: May 30, 2013

(51) Int. Cl.
*G03B 13/00* (2006.01)
*H04N 5/232* (2006.01)
*H04N 5/262* (2006.01)

(52) U.S. Cl.
CPC .................................. *H04N 5/2621* (2013.01)

(58) Field of Classification Search
CPC ............ H04N 5/23212; H04N 5/2254; H04N 13/0235; H04N 13/0239; H04N 13/0271
USPC ................................................ 348/218.8, 345
See application file for complete search history.

(56) References Cited

U.S. PATENT DOCUMENTS

| | | | | |
|---|---|---|---|---|
| 5,682,443 | A * | 10/1997 | Gouch et al. ................. | 382/254 |
| 2008/0298714 | A1 * | 12/2008 | Lee .............................. | 382/266 |
| 2012/0050562 | A1 * | 3/2012 | Perwass et al. ............. | 348/222.1 |
| 2014/0016016 | A1 * | 1/2014 | Berestov et al. ............. | 348/345 |

* cited by examiner

*Primary Examiner* — Antoinette Spinks
(74) *Attorney, Agent, or Firm* — Seyfarth Shaw LLP; Ilan N. Barzilay; David A. Klein

(57) ABSTRACT

A photography device includes a plurality of cameras arranged as an array. The array may include multiple cameras with different focal distances. Each camera has a different focal distance. Or groups of cameras in an array may share multiple focal distances. The cameras may provide a similar field of view and similar magnification. A unified image is formed by combining the images from the different cameras.

19 Claims, 15 Drawing Sheets

ARRAY OF CAMERAS WITH VARIOUS FOCAL DISTANCES

BACKGROUND

Cameras are now a standard feature on many electronic devices. Many devices have more than one camera, such as a front-facing camera and a rear-facing camera.

BRIEF DESCRIPTION OF DRAWINGS

For a more complete understanding of the present disclosure, reference is now made to the following description taken in conjunction with the accompanying drawings.

DETAILED DESCRIPTION

Figure 1:
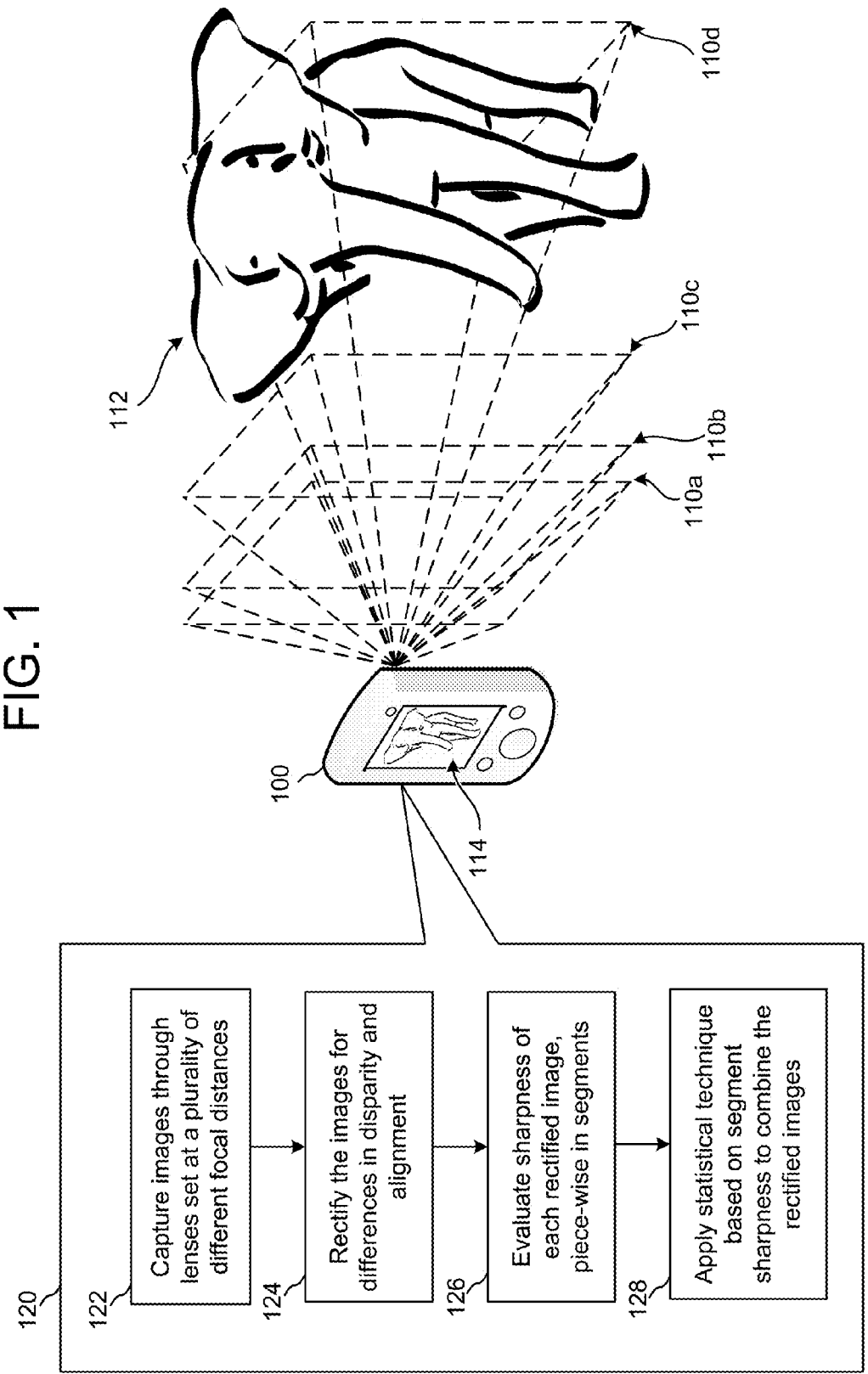
FIG. 1 illustrates a system for taking photographs using an array of camera set at different focal distances.

In contemporary handheld devices such as phones and tablets, the rear-facing camera may be the thickest part of the whole device. Such cameras take up critical space in the device, as they must often be positioned in the bezel to avoid overlaying the main display screen or other components.

A new technology being implemented in devices is "array cameras." In a simple form a camera may include a lens and a sensor. An array camera may include a number of cameras arranged together to capture one or more images. Array cameras come in several varieties. In some versions of array cameras, the cameras are all on one piece of silicon with an array lens over it. In other versions, an array of individual camera modules is assembled. In one type of array camera, all of the cameras are identical RGB (Red-Green-Blue) cameras, each taking some image (e.g., a one-megapixel image) and each being pointed in the same direction. Using image combination techniques, the minor differences in perspective, distortion, magnification and disparity (i.e., the difference in image location of an object due to spatial separation between cameras) in each camera can be corrected and the images are combined to make a new image that has better resolution and less noise than the original camera. The cameras may be set to different exposures to get a high dynamic range effect in the combined image. In another type of array camera, one camera is red, another is blue, another is green, and perhaps a fourth is panchromatic. This pattern may be repeated, for example 3 or 4 times resulting in 12 or 16 cameras total. Each camera of the array of cameras may be made up of a blue, a green, and a red channel, each channel corresponding to a dedicated image sensor and lens pair. Use of such an arrangement helps avoid the crosstalk issues associated with individual RGB Bayer cameras, resulting in a composite image with improved color purity and saturation. A panchromatic grayscale channel may also be included in each camera to improve overall sensitivity. The images from all the different cameras will have slight differences in perspective. They are combined by piece-wise realigning all of the images before adding the images to form a composite. If each camera has a different color for an individual pixel, it is necessary to go through and assign a composite pixel a color.

Array cameras can be a fraction of the thickness of conventional designs. The individual cameras are individually smaller than a conventional camera (e.g., half as tall). While each individual image sensor may be a lower resolution than an equivalent conventional camera, the images captured may be assembled into an high resolution image. For example, while each image sensor may be one megapixel, by combining images from an array of 4, 9, or 16 cameras in an array, the combined image may be 5, 8, or 13 megapixels (for example). That is, by assembling many images in combination, a significant portion of the resolution of all cameras is retained, although there are some losses due to image redundancy (i.e., having sixteen one megapixel cameras might result in only 12 megapixel images when combined due to image redundancies). Moreover, when the images are combined the noise may be reduced by root N, where N is the number of cameras. The end result is the device containing the camera array can be thin and flat, the smaller cameras provide a large depth of field, and resulting in high-resolution, low-noise composite images.

However, such small individual cameras do not offer adjustable focus. That is because when the size of the camera is reduced to increase depth of focus, it actually increases the depth of field. As a consequence, the small cameras do not require much focusing due to the large depth of field, and in any case, it can be difficult to engineer adjustable focus.

Array cameras may be constructed from one piece of silicon and then put an array of lenses over it where those lenses are built as an array. Constructed as a monolithic piece of glass or plastic, or as a composite of both (plastic lenses on a glass substrate), individual lenses cannot be easily moved up-or-down to adjust focus without moving the entire array. Moreover, in view of the scale of the array, a relatively large mechanism would be needed to make such an adjustment, and tilting of the array relative to the semiconductor substrate would need to be avoided.

The end result is array designs settle for taking advantage of large depths of focus, with large depths of field. The entire array is set at the hyperfocal point, where the depth of field is split so that everything from infinity to fairly close is in focus. What defines "fairly close" depends on the size of the camera, the focal ratio, the focal distance through the lenses, and how much blurriness is tolerable before being deemed out-of-focus.

If set at the hyperfocal distance, an array arrangement may be good for outdoor scenes and landscapes, but produces fuzzy images at distances closer than the depth of field provides.

To improve the ability to take array pictures with varying focal distances, disclosed herein is an array camera where each camera or each group of cameras has similar set at different focal distances. The techniques discussed herein may be used with any of the above (or other) varieties of array camera and lens construction.

Unlike monolithic camera modules (one sensor, one lens) where it is common to add a focusing mechanism such as a voice-coil motor to move the lens "out" of macro (close-in) focus and "in" for distant focus, array cameras typically make do with the large depth of field afforded by the small format of each individual camera of the array. Although a lens can precisely focus at only one distance at a time, the decrease in sharpness is gradual on each side of the focal distance, so that within the depth of field (DOF), the softened sharpness is imperceptible under normal viewing conditions. Note that for the same field of view and same focal ratio, a smaller camera will have a larger depth of field.

In a camera array where all of the lenses provide a same depth of field, the lenses on the array cameras may be set so that the lenses are at the hyperfocal distance. At the hyperfocal distance, the lens is set at a focal distance that puts everything from infinity to some near point within the depth of focus. That is, for example, everything from 1.5 meters to infinity will appear to be in focus and the image will degrade by becoming out of focus as the object distance decreases below the near point—in this example 1.5 meters. The hyperfocal distance is the nearest focal distance at which the depth of field extends to infinity. Focusing beyond the hyperfocal distance does not increase the far depth of field, but does decrease the depth of field as the near edge of the depth of field advances farther away from the camera.

As described herein, at least one group of cameras (a group comprising 3 or 4 image sensors comprising Red, Green, Blue and perhaps Panchromatic channels and associated lenses) are set up with a different focal distance from another group of image sensors. For example, one group may be set at the hyperfocal distance, proving an in-focus depth of field from 1 m to infinity, while a second group of is set for a closer. A second group or groups of cameras may then be configured for a much closer focal distance, for example at a point where everything from 3 cm to 6 cm is in focus. Such a group might be used for "macro" photography, and would facilitate reading things at close proximity, such as bar codes, etc. Additional groups may be included. For example, a third group or groups and a fourth group or groups could be set up for intermediate focal distances, to have an in-focus depth of fields from 5 cm to 20 cm, and 15 cm to 2 m.

By biasing a camera for "normal" distances, as well as several for "closer," images may be combined to capture more range. Besides correcting for disparities between channels and cameras, edge detection may be used to discriminate between the sharpness of edges, which can then be used to determine the best focus for that part of the image. Cameras may be statistically "weighted" as the images are combined based upon edge sharpness. Such statistical combining may produce a low noise image.

A sharpening algorithm may then be run on the composite image to make an image look even sharper. In comparison to an array camera where all lenses are set at a same focal distance, a higher degree of sharpening can be applied to an image obtained from compositing images from across multiple focal distances due to lower noise and more varied data. Ordinarily, when an image is sharpened, noise can be enhanced and false edges can appear. By having contributions from two, three, four or more focal distances, there is always some data that can be pulled out by a sharpening algorithm to improve the look of the composite image.

In operation, when the cameras are computationally corrected for disparity and alignment and the images are combined, greater weight may be given to those cameras capturing a sharper image for a particular segment of the image by virtue of having that part of the corresponding scene in-focus. Sharpness may be determined by one of many computational sharpness evaluation techniques such as edge-gradient magnitude or fractal dimension. The images may be combined using statistical techniques.

As for color and brightness, the human eye is not as sensitive to detail in color as it is to detail in brightness.

In the context of an array of cameras set at different focal distances, even though something might be a little out of focus, imprecise color has little impact so long as the colors look smooth and not "salt and peppery" or "color sprinkly" (which is how noise looks on an imager). The end result is that images from multiple camera may be used to some degree in recompositing the image. But if the image is thought of as a brightness or luminance part and then the color part, all cameras may be used almost equally in the color part to make the composite color smooth and low noise, whereas the luminance part might be biased toward the cameras that have the greatest detail because they happen to be better focused on that part of the image.

Thus, when combining images, greater weight may be given to images from the in-focus cameras for the luminance portion of the combined image, since the eye is sensitive to spatial resolution in the luminance channel. Further, in comparison to the luminance portion, the weighting for chroma may be more balanced, not giving as much preference to images from the in-focus cameras for the combined image, since the eye is less sensitive to spatial resolution in the chroma channel but is sensitive to noise in the chroma channel. Such noise can be better reduced by statistically combining information from a greater number of cameras, even if the images used are somewhat out-of-focus.

Various focal distances may be distributed across the array of cameras so that some are capable of infinity focus and some are capable of very-near macro focus and some are intermediate and the various combinations of focal distance are well distributed across the camera color types.

FIG. 1 illustrates a system for capturing an image using an array of cameras having a plurality of focal distances. In the illustrated example, the device 100 containing the camera array is a handheld device and the camera array serves as a rear-facing camera. The camera array simultaneously photographs a subject 112 at a plurality of focal distances 110*a-d*, processing (120) the multiple images to create a composite image (114). The processing includes capturing the images through lenses set at a plurality of different focal distances (122). The captured images are rectified (124), correcting differences in disparity and alignment between lenses and groups. The sharpness of each rectified image is evaluated (126), which may be done piece-wise in segments. The rectified images are then combined, applying statistical analysis to the sharpness of each segment. While out-of-focus images may contribute less to the final image, each segment of the composite image (114) may include data from all images.

How many segments the images are divided into depends on, among other things, the resolution of the images, the computational efficiency of processing either more or less granular segments, and the sharpness evaluation algorithm utilized. Segments may be very small (e.g., four spatially adjacent pixels per channel/image sensor), or may include a large portion of the image (e.g., 1/12 of the image). Analysis of the segments may include a larger area surrounding the segment (i.e., overlapping adjacent segments).

The cameras may be arranged to provide a similar field of view and similar magnification, capturing substantially coextensive images at different focuses, with "similar" in this context meaning "substantially the same," with the differences being those inherent due to the spatial separation, orientation, and manufacturing tolerances of the various lenses in the array and camera components (e.g., image differences caused by parallax when a same scene is captured by separate lenses). The focal distances of the cameras are different, but the focal lengths of the lenses of the camera array may be the same (focal length being a measure of how strongly a lens converges or diverges light).

Figure 2:
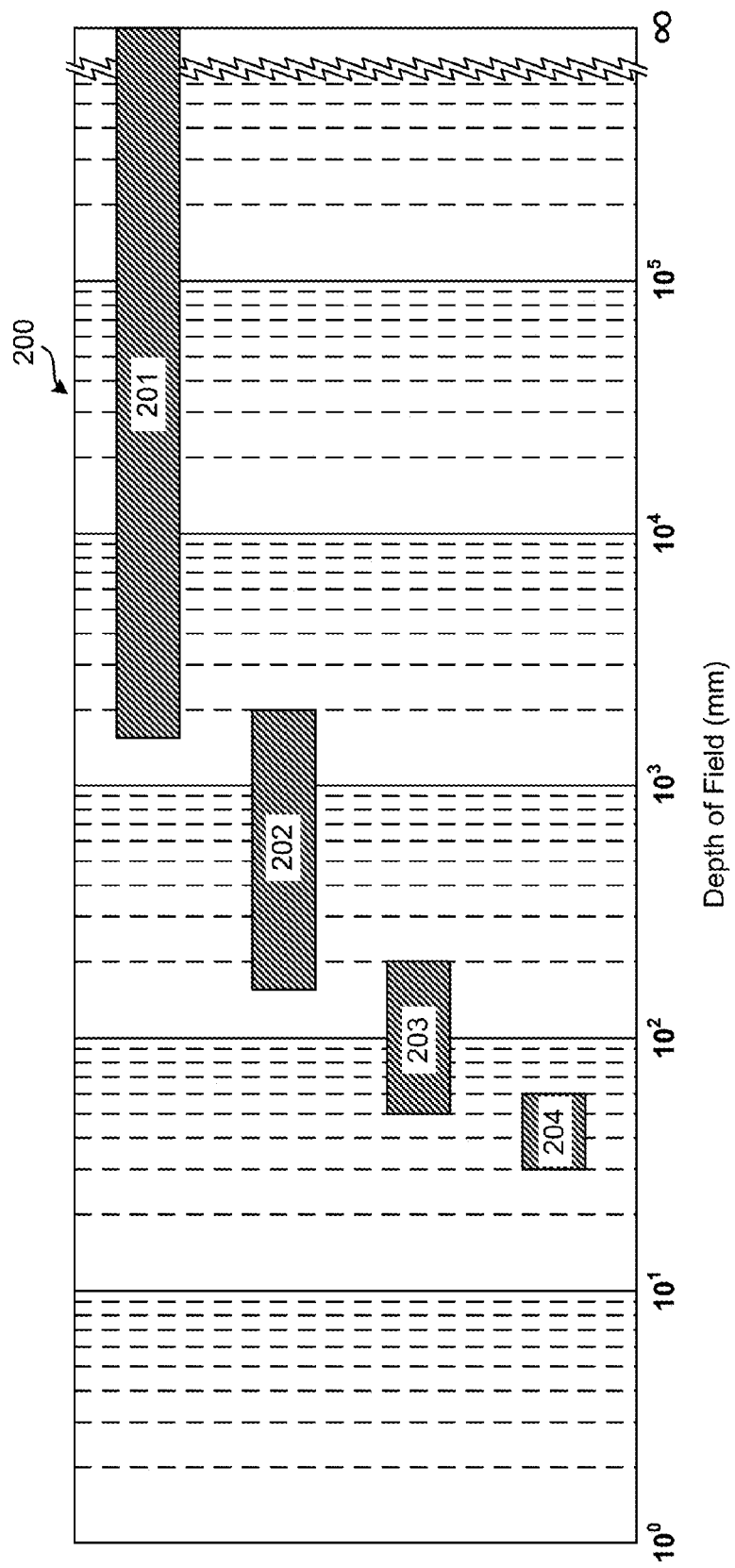
FIG. 2 is a logarithmic graph showing depths of field that may be obtained for an example set of camera set at four different focal distances.

The logarithmic graph 200 in FIG. 2 illustrates example depth of fields when four sets of camera are used. The depth of field of a first lens group (201) extends from 1.5 m to infinity (i.e., the first group is arranged at the hyperfocal distance). The depth of field of a second lens group (202) extends from 15 cm to 2 m, providing a DOF of 185 cm and 50 cm of overlap with the first lens group. The depth of field of a third lens group (203) extends from 5 cm to 20 cm, providing a DOF of 15 cm and 5 cm of overlap with the second lens group. The depth of field of a fourth lens group (204) extends from 3 cm to 6 cm, providing a DOF of 3 cm and 1 cm of overlap with the third lens group.

Figure 3:
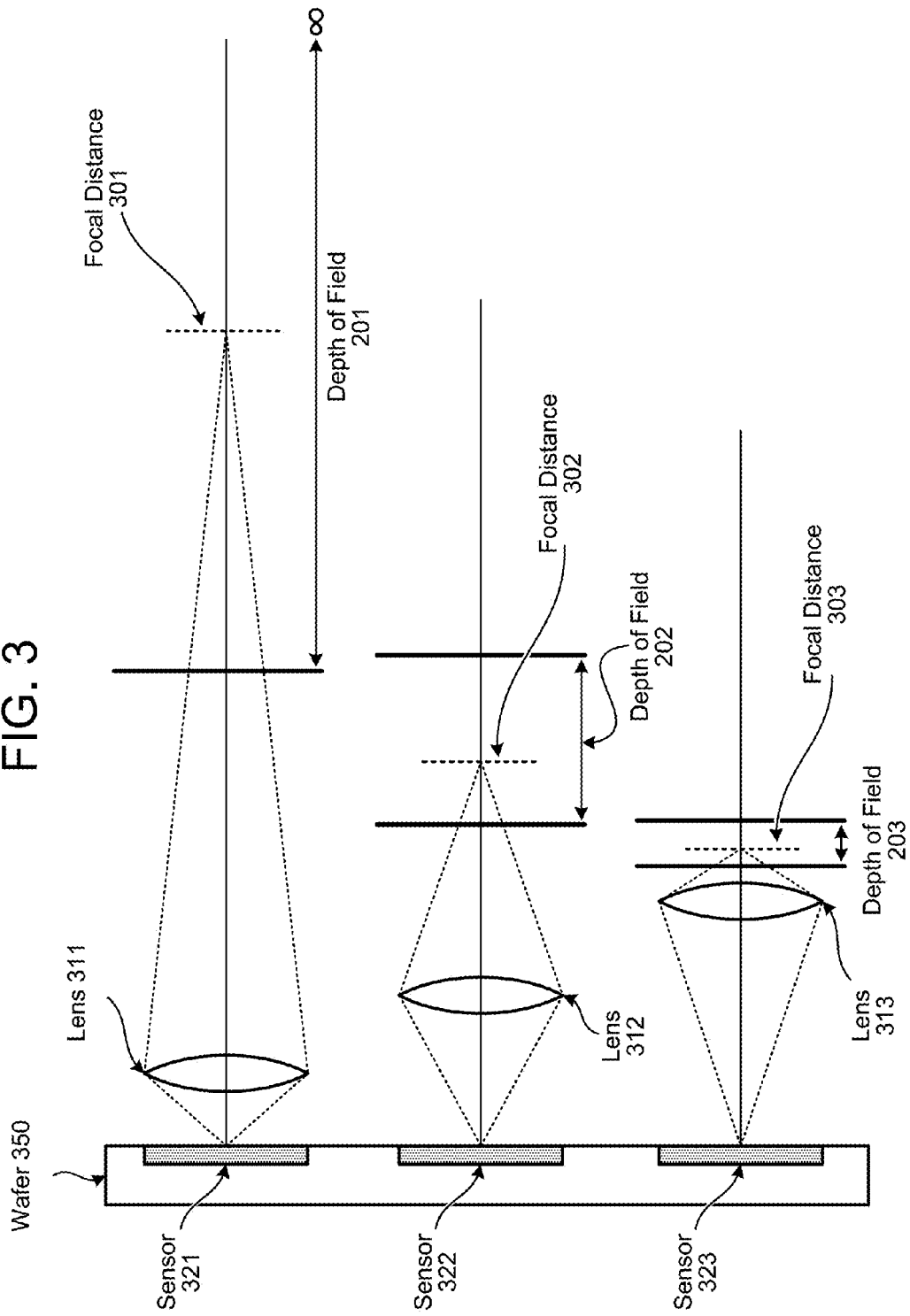
FIG. 3 illustrates the relationship between the distance between a lens-sensor pair and the resulting depth of field around the focal distance.

FIG. 3 is an example further illustrating the relationship between lens position and depth of field. For the purpose of explanation, the distances between lenses and sensors are exaggerated, as are the scales of the depths of field. As shown, a semiconductor wafer 350 includes at least three image sensors 321 to 323. Each of these image sensors is aligned with a respective lens 311 to 313, and each lens may have a same focal length. The hyperfocal distance 301 is obtained by positioning the lens 311 near to the sensor 321, providing the depth of field 201. The next lens 312 is positioned further away from the sensor 322, producing the intermediate depth of field 202 (the intermediate focal distance 302 being within the depth of field). A third lens 313 is arranged even further from the sensor 323, with a focal distance 303 producing the shallowest depth of field 313 (i.e., shallowest in this illustration).

Figure 4:
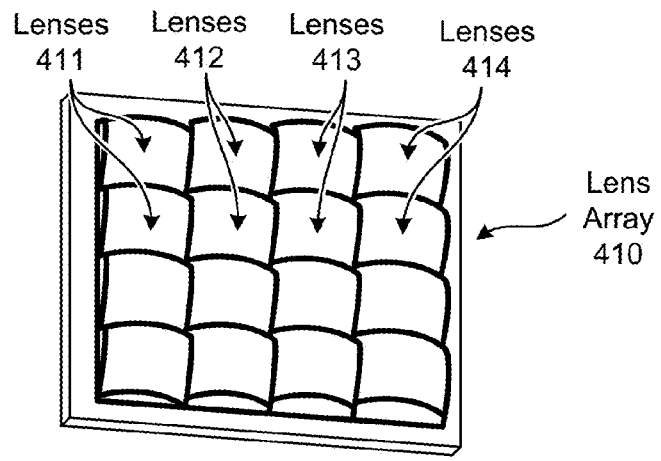
FIGS. 4 to 8 illustrate an example camera assembly and its constituent components, including a monolithic lens array providing lenses with different depths of field and an array of image sensors fabricated on a single semiconductor wafer.
Figure 5:
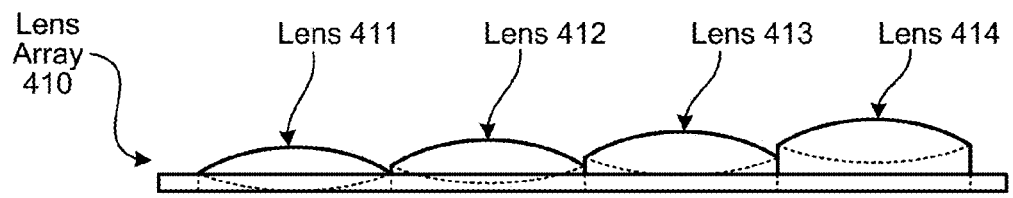

FIGS. 4 and 5 illustrate a microlens array 410 where the different focal distances have been engineered directly into the array. In this example, the lens groups are arranged in columns. A first lens group 411 is arranged to provide a farthest focal distance. A second lens group 412 provides an intermediate focal distance that is closer than that of the first group. A third lens group 413 provides another intermediate focal distance that is between that of the second and fourth lens groups. And a fourth lens group 414 provides the nearest focal distance. The focal lengths of the first, second, third, and fourth lens groups may be the same. Integrating the various focal distances into a monolithic lens array reduces the number of parts to align, thereby reducing a source of optical variations between cameras that can cause misregistration errors when images are combined.

Figure 6:
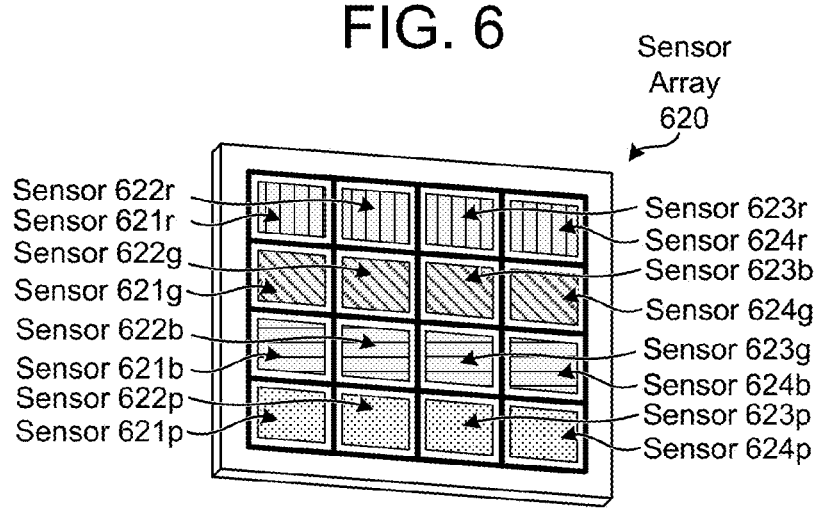

FIG. 6 illustrates a semiconductor wafer providing a sensor array 620. The sensors are arranged into four camera groups (621 to 624). Each group has a red sensor, a green sensor, a blue sensor, and a panchromatic sensor, arranged to align with the lens array 410. The sensors are tightly packed, which facilitates integration of the support circuitry for all the imagers and reduces spatial separation between camera groups (simplifying the combining of images). It also simplifies the number of external electrical connections that need to be made between the cameras and other circuitry and connectors. Areas between the image sensors where the lenses do not reach may be used for read-out circuitry, reducing the amount of read-out circuitry around the perimeter of the array. Also, integrating the cameras on a same substrate eliminates misregistration errors that flow from difference in alignment, rotation and angle that may occur when mounting separate cameras.

Figure 7:
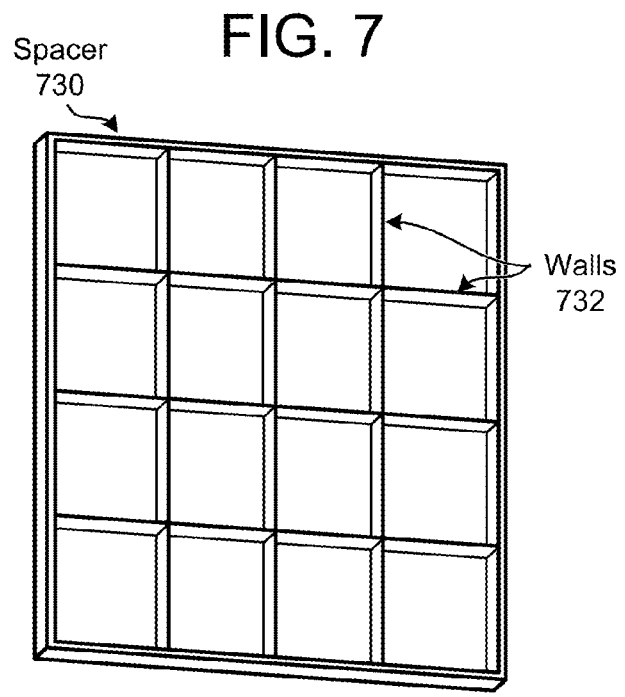
Figure 8:
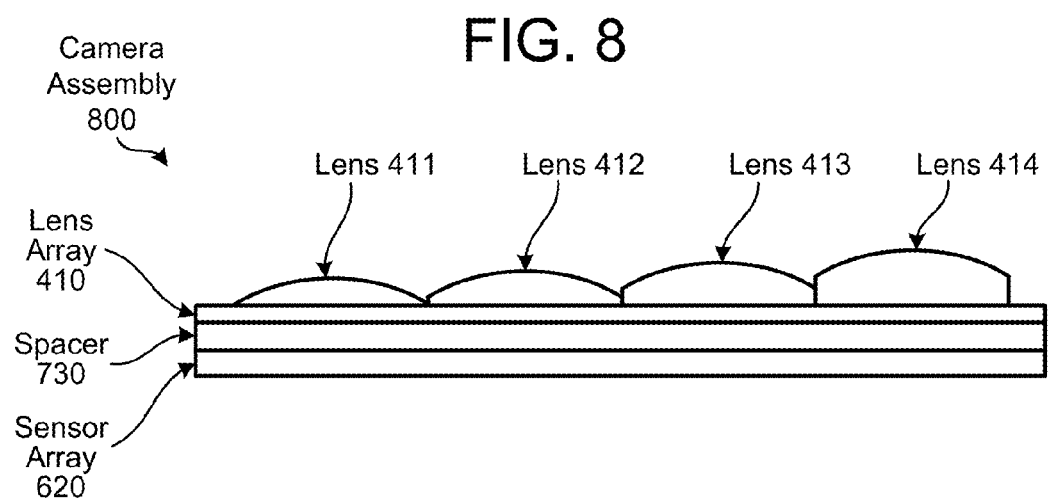

A spacer 730 shown in FIG. 7 may be arranged between the sensor array 620 and the lens array 410 to form a camera assembly 8 shown in FIG. 8. The spacer may include walls 732 to reduce optical crosstalk between image sensors-lens pairs. The spacer 730 may also be used for among other reasons such as to set the focal distances and to protect the underlying sensors from direct contact with the lenses. In practice, the spacer 730 may or may not be a separate element, as it may be engineered into an underside of the lens array 410, grown on the surface of the sensor array 620 (e.g., a planar layer of silicate glass grown on the semiconductor substrate, patterned by photolithography), or some combination thereof.

Figure 9:
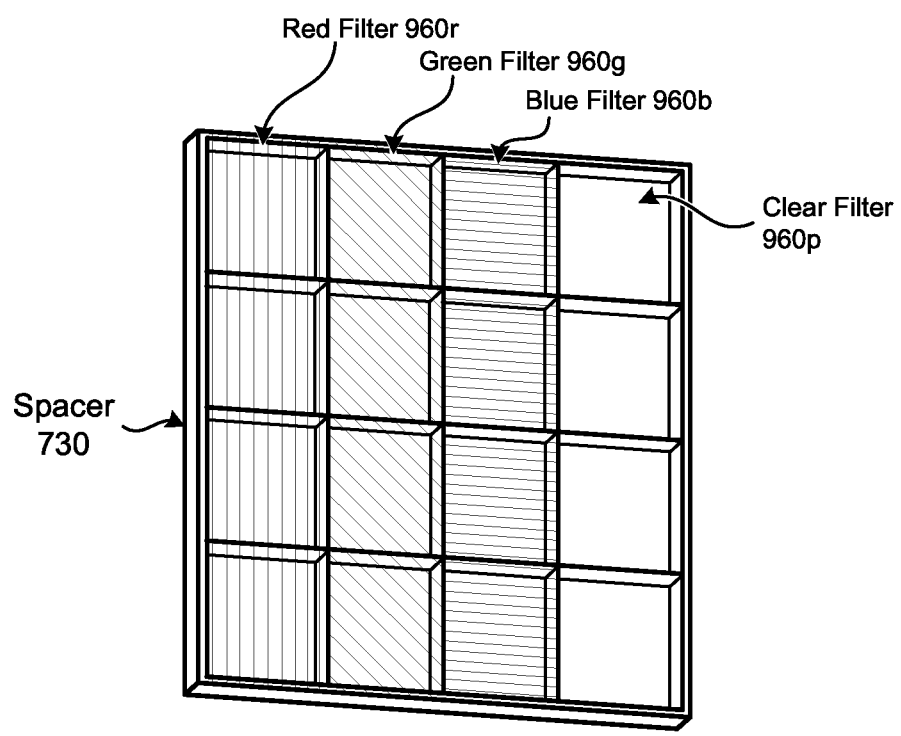
FIG. 9 illustrates a color filter that may be interposed between the image sensors and lens array.

Optimizing individual sensors for specific color channels may produce a saturated color image (optimized, for example, by adding bandpass coatings to individual image sensors and/or bandgap tuning the sensors for particular wavelength ranges). Also, individually configuring each sensor may reduce the potential for color channel crosstalk, where filtered light of one color bleeds over to a sensor for another. However, as shown in FIG. 9, if color channel discrimination is not built into the sensors, a composite filter can be interposed with the between the lenses and sensors. The composite filter includes a filter 960r that provides the red channel, a filter 960g that provides the green channel, a filter 960b that provides the blue channel, and a clear filter 960p (or no filter) that provides the panchromatic channel.

When arranging the lenses of each channel within a camera group, and the camera groups relative to each other, the effect of misregistering the superimposed images on each other is an important consideration. In particular, the distance an image object is from the camera array is consequential to misregistration, as objects far from the camera array exhibit little to no disparity, whereas objects near to the camera array will exhibit high disparity. (The concept of disparity is readily demonstrated by binocular disparity, where the closer an object comes to a person's nose, the more difficult it becomes to reconcile the difference in perspective between left and right eyes.) The impact of disparity is greatest within camera groups having short focal distances, since their depth of field may capture near-objects in focus, whereas distant objects have little to no disparity (the separation between cameras may be small compared to the distance to the objects). Likewise, disparity has the least impact on camera groups having far focal distances, since their deep depth of field may capture distant objects in focus, whereas the nearest objects in focus are more distant than the near objects of the short focal-distance cameras.

Thus, for lenses of a group set at the hyperfocal distance, spatial separation of the lenses has less impact on the registration of various channels, as the depth of field and therefore the image objects in focus will be relatively far away from the camera array. In other words, for a set of lenses set at or beyond the hyperfocal distance, the image sensors of the group's different channels can be set relatively far apart with less impact on getting the images from each channel into alignment. In comparison, spatially separating "macro" lenses set for a close focal distance can result in a large misregistration. When the images of misregistered color channels are overlayed, the resulting image may be fuzzy even after processing. Furthermore, differences in perspective between corresponding cameras can difficult to computationally reconcile.

Figure 10:
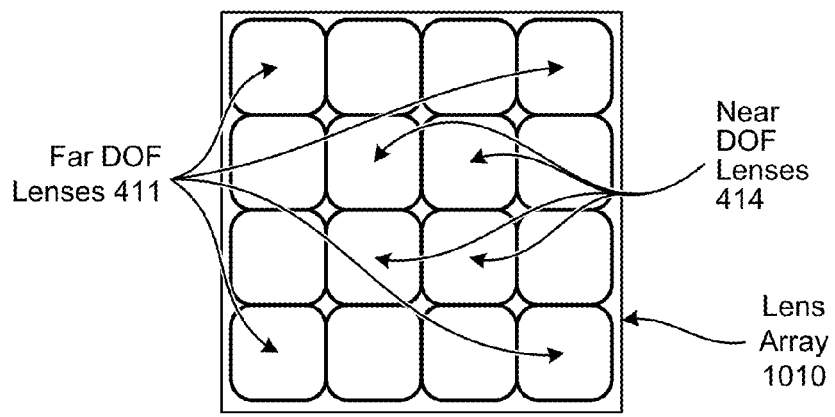
FIGS. 10 to 12 illustrate examples of different arrangements for placement of various lenses within the array so as to minimize the computational complexity of corrections needed when images are combined.
Figure 11:
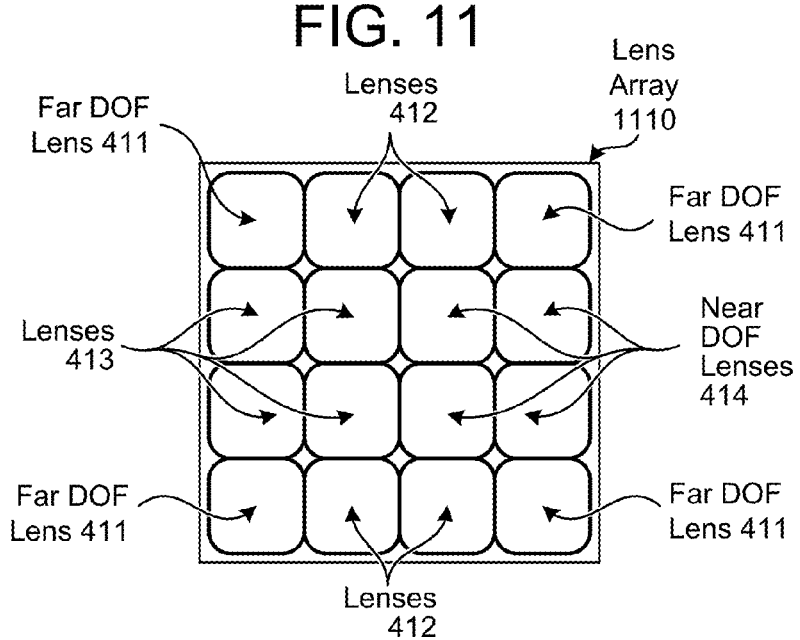
Figure 12:
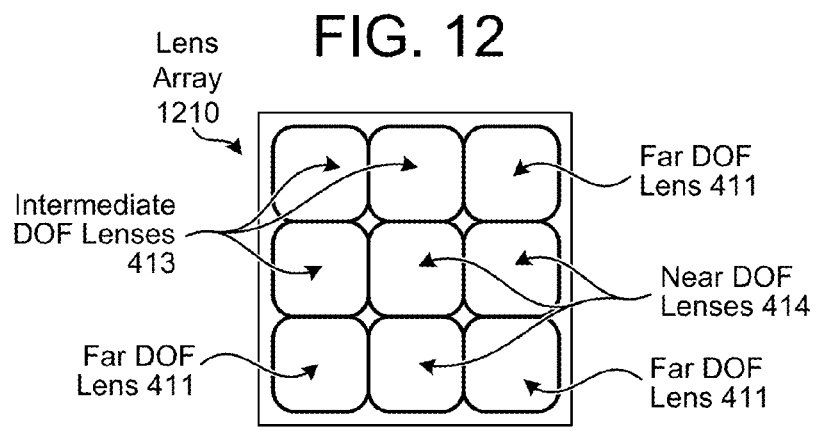

FIGS. 10 and 11 illustrate lens arrays 1010 and 1110 like that in FIG. 4, but in which the lenses have been arranged to improve composite imaging. In both figures, the near focal distance/DOF lenses 414 have been clustered adjacent to each other, whereas the lenses with the farthest focal distance/DOF have the largest spatial separation of any group of lenses in the array. FIG. 12 is a similar an example lens array 1210 for a camera that has three lens groups of three channels each, demonstrating that the lens-placement optimization concept applies without regard to the particular dimensions of the array. In addition, in FIGS. 11 and 12, disparity between camera groups is also considered, with the spatial distance between camera groups having shorter focal distance (e.g., 413, 414) being minimized, such that disparity is reduced both within the individual camera groups between channels, and as well as between the camera groups.

FIGS. 13 to 23 illustrate some other examples of how camera assemblies may be configured.

Figure 13:
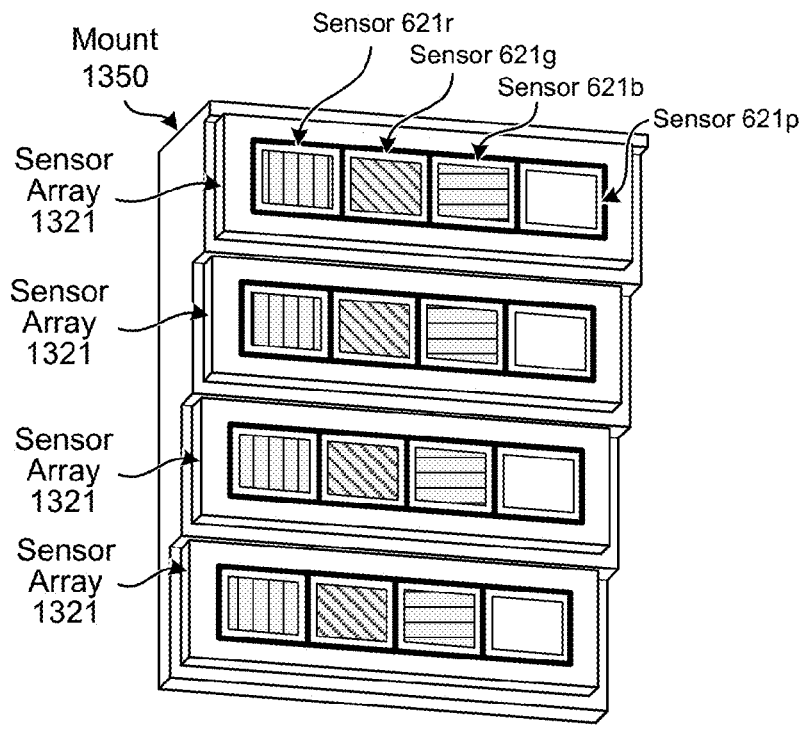
FIGS. 13 to 16 illustrate examples of a camera assembly where the difference in focal distance is set by positioning the image sensors at different distances from the lens array.
Figure 14:
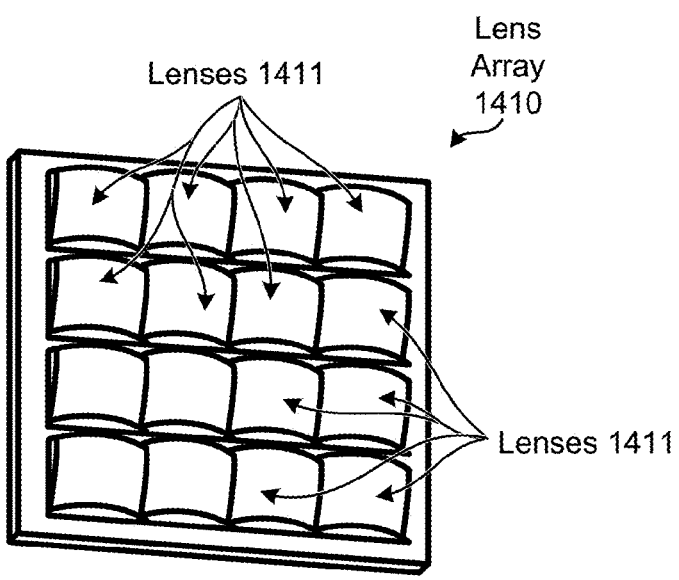
Figure 15:
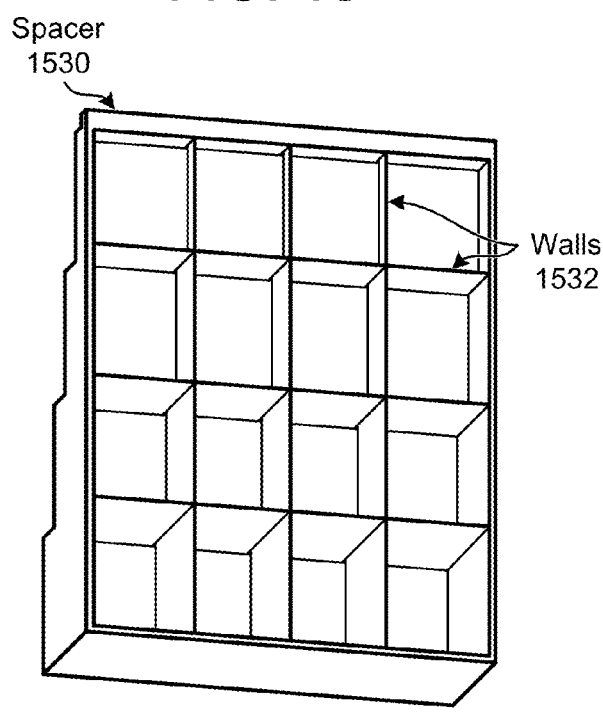
Figure 16:
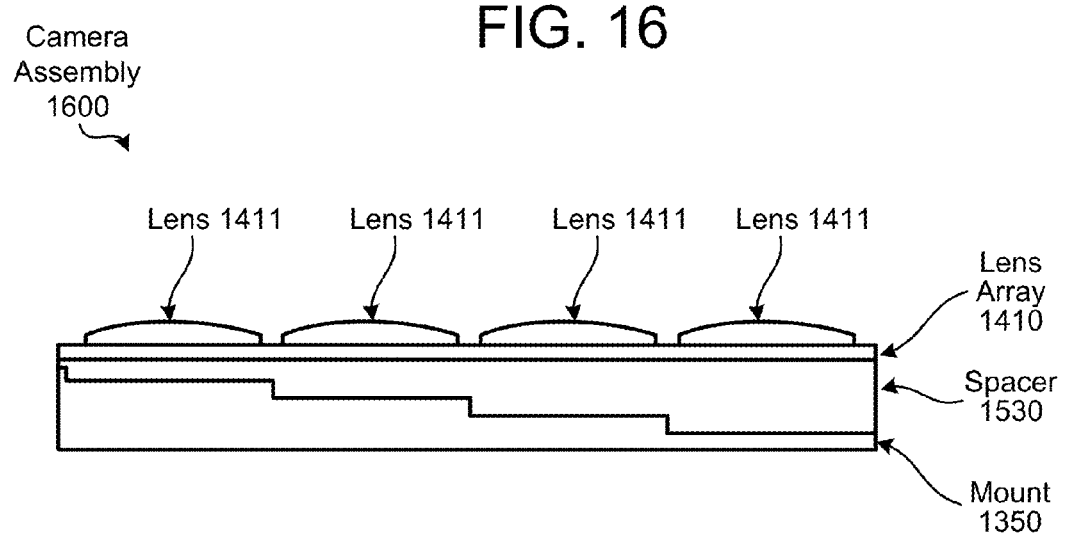

In FIG. 13, there are a plurality of sensor arrays 1321. Each sensor array forms a camera group consisting of a red sensor 621r, a green sensor 621g, a blue sensor 621b, and a panchromatic sensor 621p. By spatially offsetting each sensor array 1321 in a stair step configuration on a mount 1350, a microlens array 1410 with identical lenses 1411 may be used to achieve the different focal distances. In comparison, in the prior examples, the sensors were planar and the different focal distances were engineered into the lens array. A spacer 1530 shown in FIG. 15, which may include walls 1532 to reduce channel crosstalk, is sandwiched between the lens array 1410 and mount 1350 to form a camera assembly 1600 as shown in FIG. 16. An advantage of camera assembly 1600 is that it enables the use of a generic lens array 1410 and single-camera sensor arrays 1321, while still providing different the focal distances. In particular, this may be an advantage because both lens array 1410 and sensor arrays 1321 may be manufactured at higher yields than the comparatively complex lens array 410 and larger-area sensor array 620 used for camera assembly 800, thereby reducing component costs. Trade-offs include the need for a relatively complex mount 1350 and spacer 1530, increased potential for image misregistration (e.g., more potential sources of misalignment between cameras), and the additional complexity involved in combining the components to form camera assembly 1600.

Figure 17:
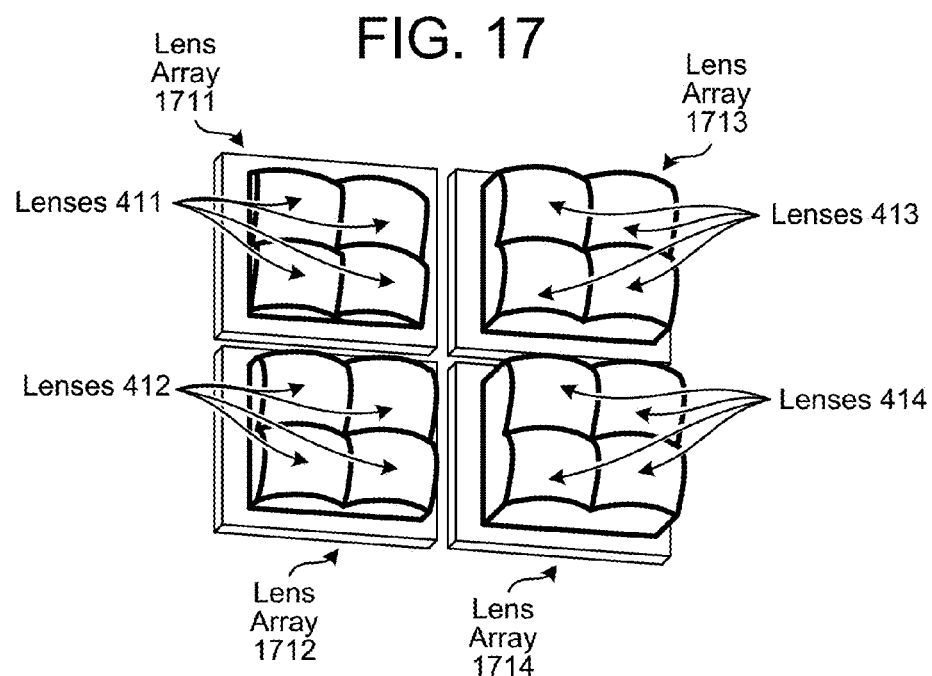
FIGS. 17 to 20 illustrate examples of camera modules where each module forms a different camera group having a different focal distance.
Figure 18:
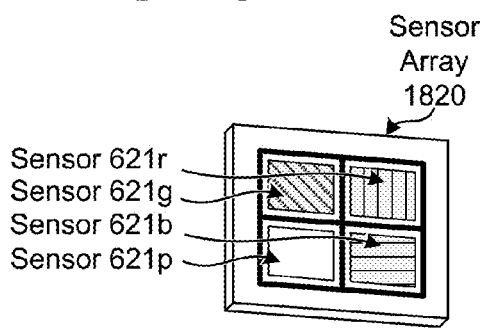
Figure 19:
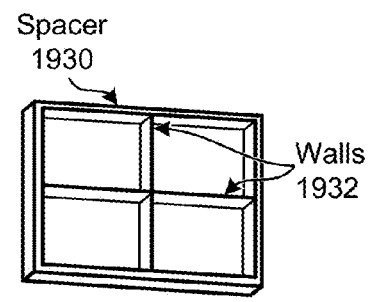
Figure 20:
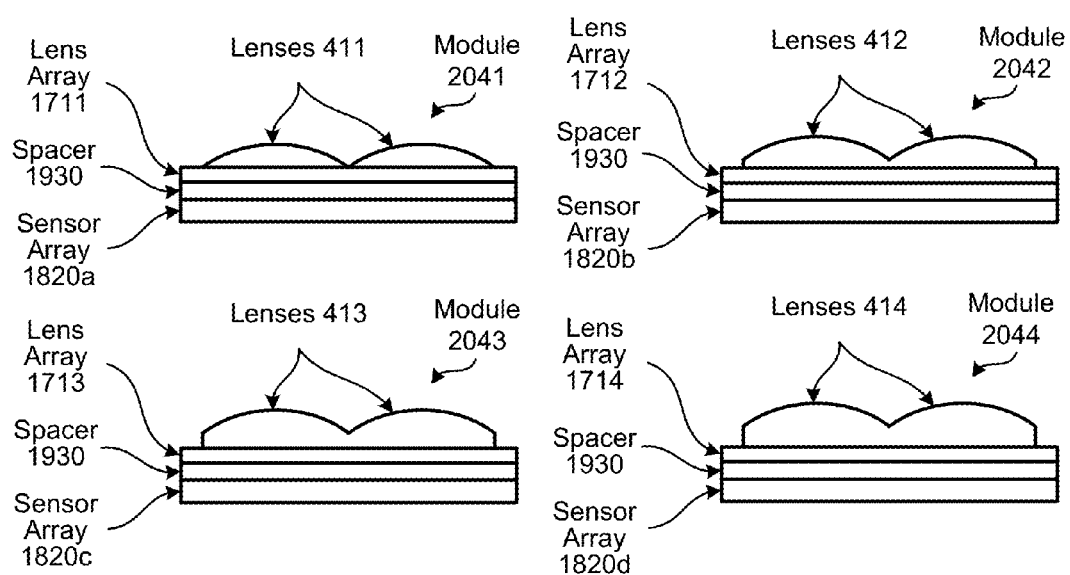

FIGS. 17 to 20 illustrate another alternative design. In this design, as shown in FIG. 17, separate lens arrays 1711 to 1714 are fabricated, each having a different focal distance. However, the lenses of lens arrays 1711 to 1714 may all have a same focal length. Each lens array is aligned with its own sensor array 1820 (FIG. 18), providing a red (621r), green (621g), blue (621b), and panchromatic (621p) channels. Sandwiching a spacer 1930 (FIG. 19, shown with walls 1932) between each lens array and sensor array produces a plurality of modules 2041 to 2044, as shown in FIG. 20. As discussed with spacer 730, spacer 1930 may be part of the sensor array 1820, the lens arrays 1711 to 1714, or a combination thereof. The modules may mounted on or bonded to a substrate or adhered to a case to form a camera assembly.

This approach allows groups with different focal distances to be mixed-and-matched at a time of device assembly. Also, this approach enables construction of a sparse array where camera groups are separated across the face of the device (e.g., along the edges). For example, the camera groups could be scattered across the back of a tablet computer with several centimeters between arrays. While this complicates image processing, it provides higher-range depth information and such an arrangement allows device designers to spread out the cameras within the device to locations where there is free or available space.

Figure 21:
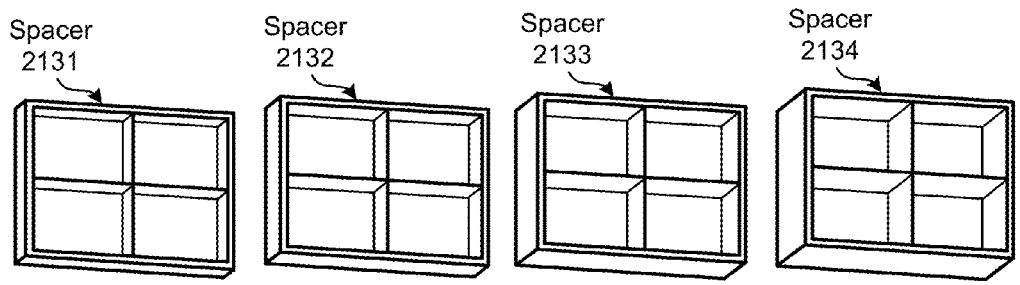
FIGS. 21 to 23 illustrate another example of camera modules where each module forms a different camera group having a different focal distance.
Figure 22:
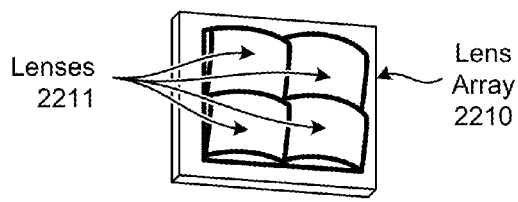
Figure 23:
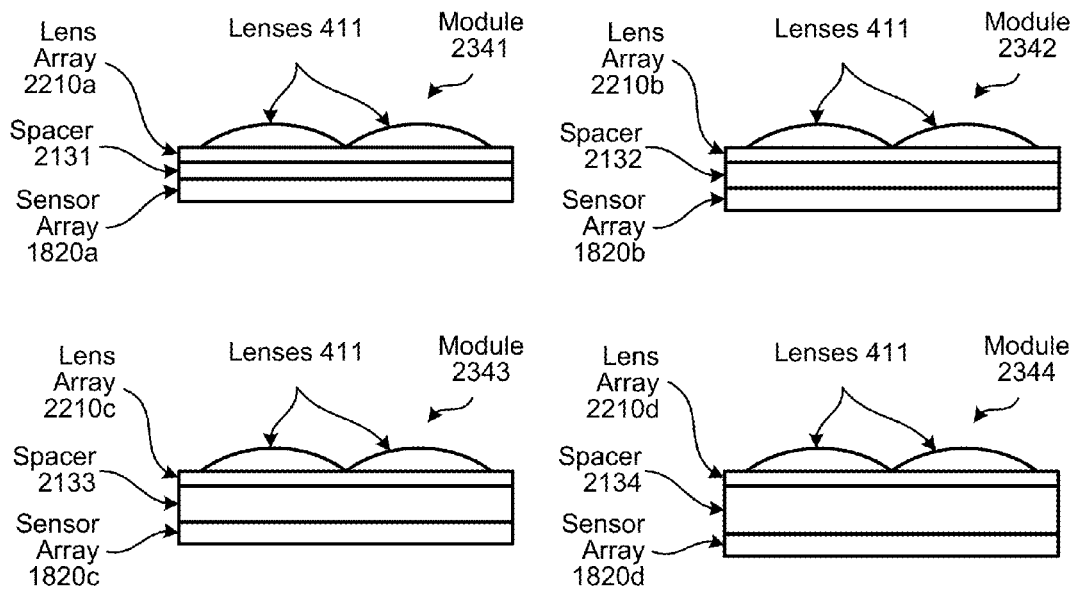

The example in FIGS. 21 to 23 is similar to the previous example, but uses a uniform lens array 2210 of identical lenses 2211 (FIG. 22), relying on spacers 2131-2134 to set the focal distance. Modules 2341 to 2344 may be mounted on or soldered to a substrate or adhered to a case to form a camera assembly. Like the previous example, the modules can be mixed-and-matched and used to make sparse arrays.

Figure 24:
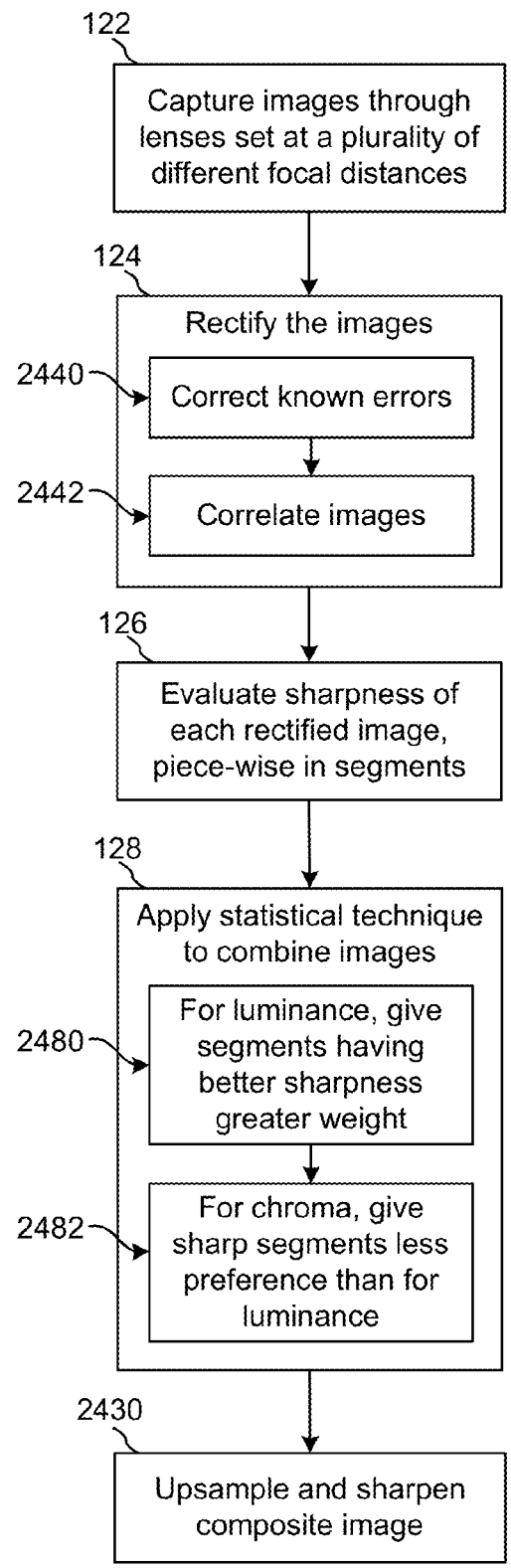
FIG. 24 illustrates a method for capturing images using an array of lenses with different focal distances.

FIG. 24 illustrates a method for capturing images using an array of lenses with different focal distances and expands on the algorithm shown in the system in FIG. 1.

Because the cameras are not all in a same place, the separation produces alignment and parallax errors that may require correction. How large the errors are depends in part on how far away a captured scene is from the camera array. The further away the subject is, the more trivial the image registration errors. At infinity, there would be no superposition errors between cameras besides errors produced by manufacturing defects.

Misregistration errors appear as a fuzziness when the superimposed images are stacked on each other. This fuzziness may be mitigated by piece-wise realigning each image. This may be done, for example, by applying an auto-correlation technique, and maybe performed in two steps.

In a first step (2440), known errors of the camera are corrected. For example, some cameras may be pointing in different directions because the lens array was not perfect or because a monolithic piece of silicon was not used. Also, some cameras may be rotated about the axis, which may involve computational correction. (The lack of rotational errors is an advantage of a monolithic sensor array, but even then there may be other small errors). These errors may be reduced by calibrating the cameras at the time of manufacturing, and remaining errors (such as pointing errors) may be corrected for by computationally simple transformations.

In the second step (2442), misregistrations are corrected. Misregistrations are dependent on object distance. When the images are piece-wise aligned before stacking, it is determined how much different regions must be shifted, which provides a "distance map." Objects that require no shift or adjustment can be assumed to be at infinity (in terms of distance from the lenses). But at some threshold distance it is necessary to start adjusting the image in order to get the different images to align. The objects that require the most shifting may be relatively close to the cameras. By going backwards, it is possible to determine the separation between the camera groups and individual image sensors, and the amount of disparity (how much image segments must be shifted) that is required to align the images. The degree of disparity correlates with distance, which can be used to construct a distance map sometimes referred to as a "Z map" (where Y is up/down, X is right/left and Z is distance away).

The distance map has uses beyond image correction. For example, if doing a video conference and the person involved in the conference is only one meter away, everything further than two meters may be regarded as unneeded background. Rather than wasting bandwidth to send the portions of the image conveying background, the data corresponding to image segments exceeding a threshold distance (e.g., two meters) may be dropped, or something else like a solid color or other image can be "underlayed" behind the person. Distance maps can also be used when augmenting the image with additional objects or information and used to obtain the correct perspective and obscuration for integrating the additional objects within the original image.

As mentioned above, sharpness evaluation (126) may be determined by one of many computational sharpness evaluation techniques such as edge-gradient magnitude or fractal dimension. Although the segments evaluated may be either small or large in terms of pixel count, if small segments are used, additional boundary pixels that overlap and include surrounding segments may be used to avoid undersampling. Overlap may also be used with large segments as well, but in terms of area evaluated, the overlapping boundary pixels may be a majority of the area evaluated with a small segment, whereas it may be a relatively small addition to a large sample.

When the image segments are combined 128, the luminance/brightness is weighted (2480) by giving greater statistical weight to segments having the better sharpness, but when chroma/color is weighted (2482), the preference given to segments having the better sharpness is reduced in comparison to the weighting used for luminance, increasing the chroma contribution of segments having the less sharpness to the composite image. That is to say, sharper segments may still contribute more to chroma than less sharp segments, but the statistical weight between segments is more balanced than is used for luminance. In the alternative, chroma/color may be averaged.

When aligning edges, some edges will have higher gradients or a higher contrast than others. This information can be used to bias the combination so as to preserve the highest gradient of the edge, at least in the luminance space ("black-and-white" or grayscale brightness part of a picture). On the color side (chroma), noise in color benefits from statistical color smoothing, which is a benefit of stacking all of the images for color and making the color smooth and true, but keeping the detail in the luminance so that image looks sharp. In terms of perception, color detail is an order of magnitude less important than luminance detail.

An example of a statistical technique that may be used when images are combined (128) is variable-pixel linear reconstruction.

The composite image may be upscaled and sharpened (2430). Combining, upscaling, and/or sharpening may include the application of a "superresolution" technique.

Upscaling/upsampling may be performed as the images are combined, sub-sampling pixels across image segments. This may include application of a superresolution technique, sub-sampling across segments to produce a higher-resolution image. An advantage of upscaling by sub-sampling across multiple segments is that it takes advantage of the difference between images to more effectively interpolate pixels. Alternatively, but less-effectively, upscaling may be performed on the composite image, which may include application of a single-frame superresolution technique. With either approach to upscaling, additional sharpening may be performed on the upscaled composite image.

Figure 25:
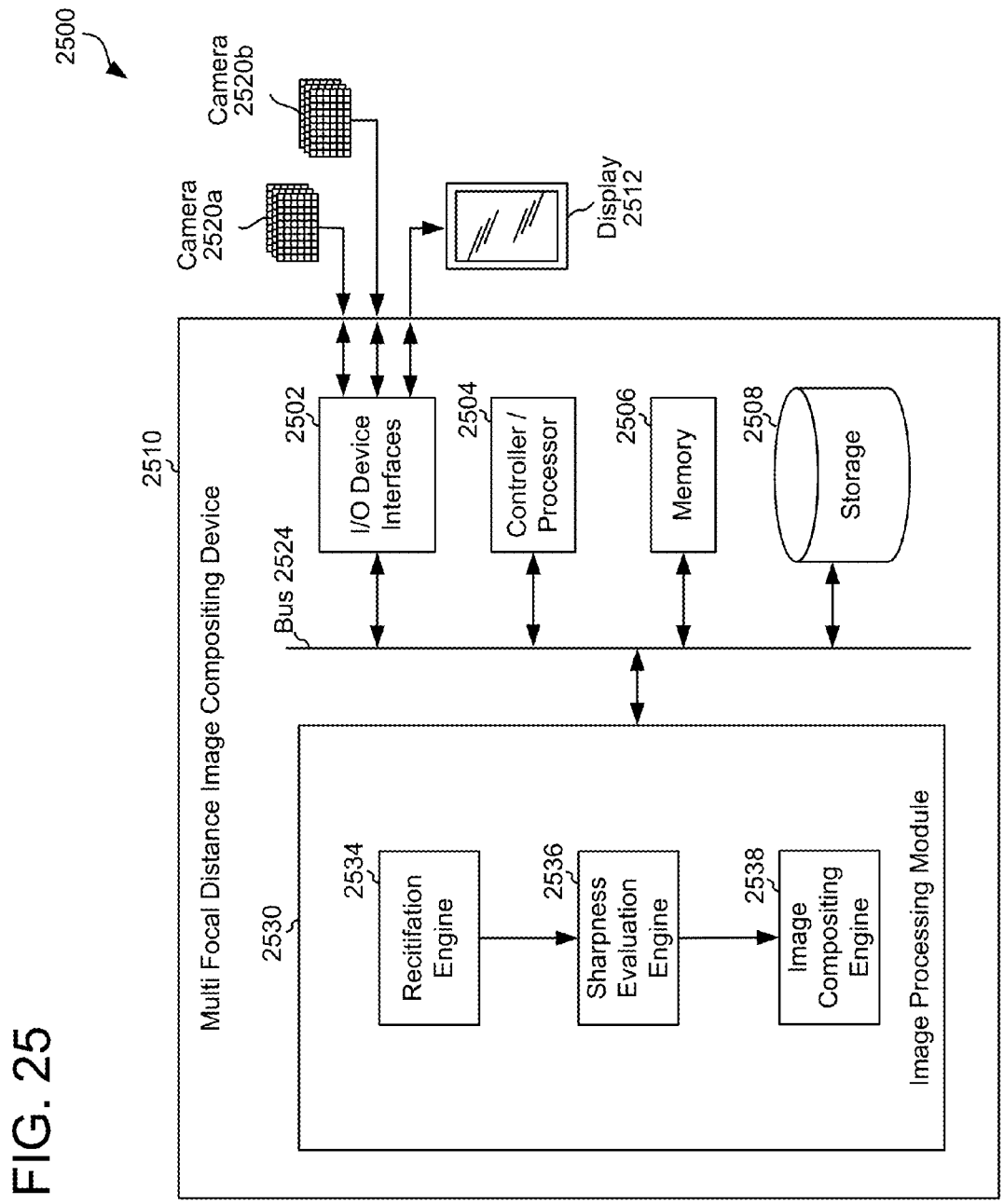
FIG. 25 is a block diagram conceptually illustrating components of a device for composing a photograph from multiple images taken an array of cameras set at different focal distances.

FIG. 25 is a block diagram conceptually illustrating a system 2500 including a multi focal distance image compositing device 2510 for carrying out the processes shown in FIG. 1 and FIG. 24. Some or all of the components of system 2500 may be built in to the device 100 in FIG. 1. Aspects of the system 2500 include computer-readable and computer-executable instructions that may reside on the device 2510.

FIG. 25 illustrates a number of components that may be included in the system 2500 with the image compositing device 2510, however other non-illustrated components may also be included. Also, some of the illustrated components may not be present in every device capable of employing the general concepts of the system for taking photographs using an array of cameras set at different focal distances. Further, some components that are illustrated in the image compositing device 2510 as a single component may also appear multiple times in a single device. For example, the device 2510 may include multiple input/output device interfaces 2502 or multiple controllers/processors 2504.

Multiple image compositing devices 2510 may be employed in a system 2500. In such a multi-device system, the image compositing devices 2510 may include different components for performing different aspects of the image compositing process. The multiple devices may include overlapping components. The image compositing device 2510 as illustrated in FIG. 25 is exemplary, and may be a stand-alone device or may be included, in whole or in part, as a component of a larger device or system. The various components illustrated as part of device 2510 may be spread across multiple devices.

The concepts disclosed herein may be applied within a number of different devices and computer systems, including, for example, digital cameras, cellular phones, personal digital assistants (PDAs), tablet computers, wearable computers with a head-mounted camera and display, other mobile devices, etc. The image compositing device 2510 may also be a component of other devices or systems that may provide processing services to a device containing a camera via a network, including a general-purpose computing systems, server-client computing systems, mainframe computing systems, telephone computing systems, laptop computers, etc.

As illustrated in FIG. 25, the system 2500 including the image compositing device 2510 may include a plurality of cameras 2520a and 2520b, where each camera has a different focal distance. Each camera 2520 may include a plurality of image sensors, each sensor being aligned with and paired with a lens. The individual sensors may be of any design, such as charge-coupled device (CCD) image sensor or an active-pixel sensor (APS). With reference to FIGS. 4-8, each camera would comprise a red sensor, a green sensor, a blue sensor, and a panchromatic sensor (in other words, in FIG. 6, a column of sensors). This is also true for FIGS. 13-16 (a row of sensors). In FIGS. 17-20 and FIGS. 21-23, each camera would be a module. While these examples all include an array of four image sensors in the camera, other arrangements are also possible, such as if each camera includes a single panchromatic sensor, a polychromatic sensor, or an array of three color sensors.

The system 2500 may also include a display 2512 of any suitable technology, such as a liquid crystal display, an organic light emitting diode display, electronic paper, an electrochromic display, a cathode ray tube display, a field emission display, a pico projector or other suitable components for displaying images and/or video. The display 2512 and cameras 2520a/b may each be integrated with the image compositing device 2510 or may be separate.

The image compositing device 2510 may also include an address/data bus 2524 for conveying data among components of the image compositing device 2510. Each component within the device 2510 may also be directly connected to other components in addition to (or instead of) being connected to other components across the bus 2524.

The image compositing device 2510 may include a controller/processor 2504 that may each include one or more central processing units (CPUs) for processing data and computer-readable instructions, and a memory 2506 for storing data and instructions. The memory 2506 may include volatile random access memory (RAM), non-volatile read only memory (ROM), and/or other types of memory. The image compositing device 2510 may also include a data storage component 2508, for storing data and instructions. The data storage component 2508 may include one or more storage types such as magnetic storage, optical storage, solid-state storage, etc. The device 2510 may also be connected to removable or external memory and/or storage (such as a removable memory card, memory key drive, networked storage, etc.) through the input/output device interfaces 2502. Computer instructions for processing by the controller/processor 2504 for operating the device 2510 and its various components may be executed by the controller/processor 2504 and stored in the memory 2506, storage 2508, an external device, or in memory/storage included in the image processing module 2530 discussed below. Alternatively, some or all of the executable instructions may be embedded in hardware or firmware in addition to or instead of software. Thus, the systems, processes, and algorithms disclosed herein may be implemented in various combinations of software, firmware, and/or hardware.

The image compositing device 2510 includes input/output device interfaces 2502. A variety of input/output devices may be included in the device. Example input devices include an audio capture device such as a microphone, additional cameras 2520 which are included in the array, and an additional camera unrelated to the array (such as a front-side camera on a handheld device if the rear-side camera is the array). Example output devices include the display 2512 and an audio output device such as a speaker. The input/output device interfaces 2502 may also include an interface for an external peripheral device connection such as universal serial bus (USB), FireWire, Thunderbolt or other connection protocol. The input/output device interfaces 2502 may also include a network connection such as an Ethernet port, modem, etc. The input/output device interfaces 2502 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device interfaces 2502, the image compositing device 2510 may connect to a network, such as the Internet or private network, which may include a distributed computing environment.

The image compositing device 2510 further includes an image processing module 2530 for combining the images from the array of cameras set at different focal distances. The image processing module 230 performs the image processing aspects described in the process in FIGS. 1 and 25. A rectification engine 2534 rectifies (124) the various images so that they may be superimposed. A sharpness evaluation engine 2536 performs a piece-wise evaluation of the sharpness of the rectified images (126) by image segment. An image compositing engine 2538 applies a statistical technique to combine the images (128) based on the evaluation of sharpness for each segment. Some or all of the upscaling and sharpening functionality may also be included in the image compositing engine 2538. The image processing module may also include an image sharpening engine (not shown) to sharpen the composite image (2430).

Figure 26:
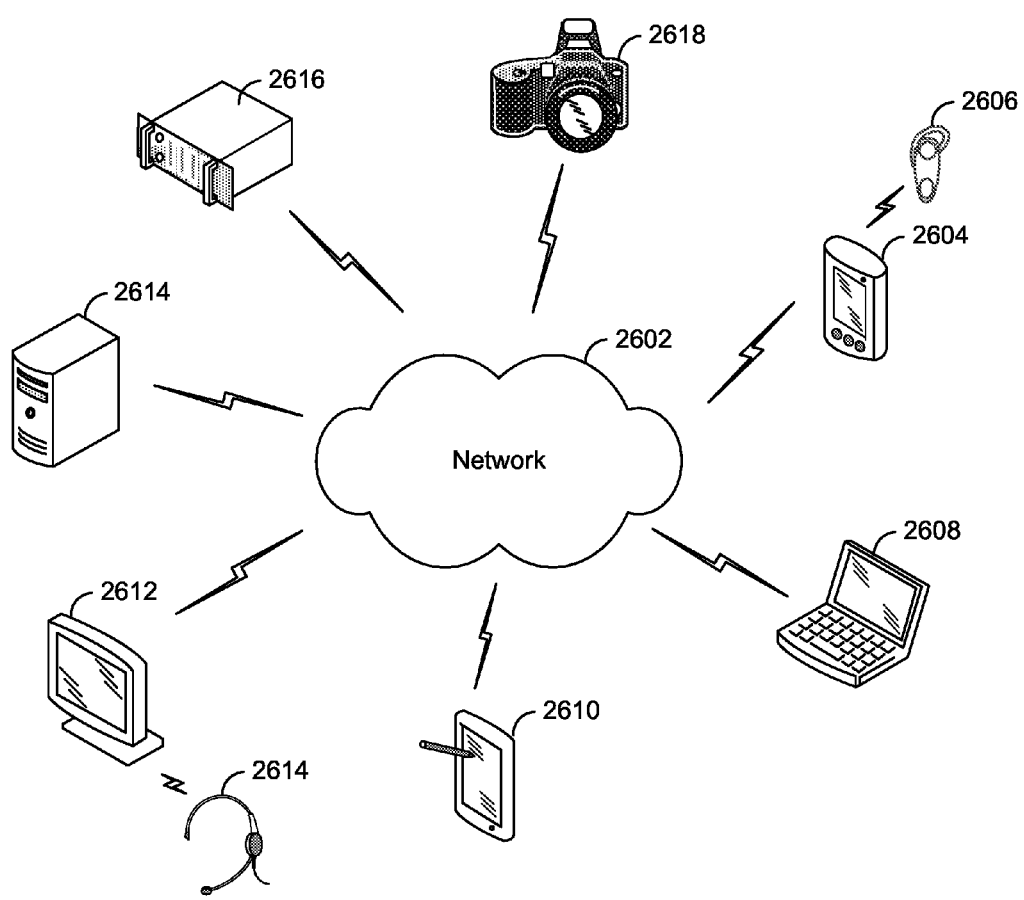
FIG. 26 illustrates an example of a computer network for use with devices described in the present application.

As illustrated in FIG. 26, multiple devices (2604-2618) may contain components of the system 2500 and the devices may be connected over a network 2602. Network 2602 may include a local or private network or may include a wide network such as the internet. Devices may be connected to the network 2602 through either wired or wireless connections. For example, wireless device 2604 may be connected to the network 2602 through a wireless service provider. Other devices, such as computer 2612, may connect to the network 2602 through a wired connection. Other devices, such as laptop 2608 or tablet computer 2610 may be capable of connection to the network 2602 using various connection methods including through a wireless service provider, over a WiFi connection, or the like. Networked devices may acquire the images from an array of camera, and separately process and composite those images. Input and output devices may be connected to networked devices either through a wired or wireless connection.

In certain system configurations, one device may include the array of camera and another device may composite the images. For example wireless device 2604, wireless headset 2606, laptop 2608, tablet computer 2610, wired headset 2614, or camera 2618 might contain the array of cameras, whereas computer 2612, computer 2614, or server 2616 might contain the image processing module 2530. Because compositing the images may involve significant computational resources, in terms of both storage and processing power, such split configurations may be employed where the device image acquisition device has lower processing capabilities than a remote device.

The above examples are meant to be illustrative. They were chosen to explain the principles and application of the disclosure and are not intended to be exhaustive or to limit the disclosure. Many modifications and variations on the disclosed examples may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The microlens arrays may be manufactured using techniques similar to those used in fabricating silicon wafers. For example, a large diameter piece of glass (e.g., 200 or 300 mm) can be used as a substrate, and then the lenses can either be etched out of the glass, grown on the surface, or otherwise deposited thereon. Another approach is to form the array using a mold (e.g., using all plastic, or pressing hot glass, or molding plastic over glass). The spacing between lenses is easily controlled using either approach.

The lenses of the microlens arrays discussed herein may be one optical element, or each may be a stack of multiple optical elements. Likewise, multiple layers of microlenses may be aligned to form the microlens array as a multi-lens stack. Also, while the figures illustrate the lenses as being arranged in a grid pattern, other array patterns may be used, such as hexagonal arrays (with the associated image sensors arranged in a corresponding pattern).

While it is advantageous to cluster the lenses in close proximity to each other to minimize the amount of image correction necessary when images are combined, sparse arrays may be beneficial when adding cameras to devices where internal space is limited. The arrangement of sparse arrays may or may not be in a geometric pattern, and may appear to be random. A sparse array is distinguished from other designs by including at least one lens-sensor pair that is not contiguous or adjacent with any other lens of the camera array.

Although the examples have the cameras of the camera array oriented in a same direction (e.g, as when arranged as a back-side camera), the sensor and lens might also be spread out with different orientations and internal to a device, using prisms to redirect light from one or more apertures to the different camera modules.

Although the examples contain multiple monochromatic image sensors (i.e., a red sensor, a blue sensor, a green sensor, and sometimes a panchromatic sensor), polychromatic image sensors might also be used, such as integrated red-green-blue sensors (e.g., Bayer-type sensors), where the different colors share a common lens. Such an arrangement would still entail a plurality of lenses, each having a different focal distance, providing each of corresponding polychromatic image sensor with a different depth of focus. Similarly, a camera of the array might be a single-channel image sensor (e.g., panchromatic) paired with a lens.

The image sensors may have an identical density of pixels, or the density of pixels may be different based on the focusing properties of the corresponding lenses. However, the sensors may still have a same total number of pixels and each lens-sensor pair may still provide the same magnification and field-of-view as the sensor-lens pairs in the other cameras of the array.

While the system is generally discussed herein as being an integrated or network-distributed system, the concept of capturing a scene at multiple focal distances would apply equally to a system where the array of cameras captures the multiple images and stores them for later processing by an image compositing device 2510 that may not be connected to the device containing the array of cameras at the time the images are captured.

When the cameras and/or individual image sensors capture a scene (e.g., 122), images may be captured simultaneously, or at least, substantially simultaneously, so as to minimize motion-induced misregistration. "Substantially simultaneous" capture may occur if, for example, individual images are sequentially buffered, stored, and/or transmitted as they are acquired (e.g., in a network-distributed system where the capturing device has limited memory and processing power).

Features of the multi-focal-distance image compositing device of the present disclosure may be implemented as a computer method, a system or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A photography device including an array of cameras of different focal distances arranged to simultaneously take a picture, the device comprising:
   at least one processor;
   the array of cameras comprising a first, second and third camera, each camera having a different in-focus focal distance and comprising at least three image sensors, each image sensor being paired with a lens, the lenses of the image sensors of each camera providing the in-focus focal distance of the respective camera;
   a memory device including instructions operable to be executed by the at least one processor to perform a set of actions, configuring the at least one processor:
      to receive image data from the first, second, and third cameras;
      to rectify the image data, for each respective camera, to correct differences of disparity and alignment between images from the at least three image sensors of the respective camera, to produce rectified images for each of the cameras; and
      to combine the rectified images into a unified image, the unified image to be a composite of the rectified images from all three cameras,
   wherein
      the first camera has a first in-focus focal distance,
      the second camera has a second in-focus focal distance, greater than that of the first camera,
      the third camera has a third in-focus focal distance, greater than that of the first and second cameras,
      each of the cameras and each image sensor of the at least three image sensors of each of the cameras, provides a similar field of view and similar magnification, and
      spatial separation of the lenses of each camera of the array of cameras are arranged based on the in-focus focal distance, all of the lenses of the first camera being clustered proximate to each other, and at least two of the lenses of the third camera not being proximate to each other.

2. The photography device of claim 1, wherein:
   the third in-focus focal distance is equal to or greater than a hyperfocal distance of the device, providing the third camera with a depth-of-field having a far limit of infinity; and
   the depths-of-field of the first and second cameras provide a far limit that is finite.

3. The photography device of claim 2, wherein the far limit of the depth of field of the first camera overlaps with the depth of field of the second camera, and the far limit of the second camera overlaps with the depth of field of the third camera.

4. The photography device of claim 1, wherein the first, second and third cameras are not proximate to each other as located on the photography device.

5. The photography device of claim 1, wherein each of the lenses of the cameras of the array of cameras has a same focal length.

6. The photography device of claim 1, wherein the at least three image sensors of each camera of the array of cameras comprise a red channel image sensor, a green channel image sensor, and a blue channel image sensor, the image data for each respective camera comprising red-channel data from the red-channel image sensor, green-channel data from the green-channel image sensor, and blue-channel data from the blue-channel image sensor.

7. The photography device of claim 1, wherein the similar field of view and similar magnification provided by each of the image sensors configures each camera, and each of the image sensors of the at least three image sensors of each camera of the array of cameras, to capture substantially coextensive images.

8. The photography device of claim 1, wherein the similar field of view and similar magnification provided by each of the image sensors configures each camera of the array of cameras to capture images that are coextensive but-for image differences due to spatial separation between the lenses that are paired with the image sensors.

9. A device comprising a plurality of cameras arranged as an array to capture a plurality of images for compositing, the plurality of cameras comprising:
- a first camera having a first in-focus focal distance, the first camera comprising a plurality of first image sensors and first lenses, each first image sensor being paired with a corresponding first lens;
- a second camera having a second in-focus focal distance, the second in-focus focal distance being less than the first in-focus focal distance, the second camera comprising a plurality of second image sensors and second lenses, each second image sensor being paired with a corresponding second lens;
- at least one processor; and
- a memory device including instructions operable to be executed by the at least one processor to perform a set of actions, configuring the at least one processor:
  - to receive first image data from each of the first image sensors;
  - to rectify differences of disparity and alignment between the first image data from each of the first image sensors, to produce a first rectified image from the first camera;
  - to receive second image data from each of the second image sensors;
  - to rectify differences of disparity and alignment between the second image data from each of the second image sensors, to produce a second rectified image from the second camera; and
  - to combine rectified images from the plurality of cameras including the first rectified image and the second rectified image into a unified image, the unified image to be a composite image of the rectified images from each of the plurality of cameras,
- wherein each of the first camera, the second camera, the plurality of first image sensors, and the plurality of second image sensors provide a similar field of view and similar magnification, and
- the second lenses are clustered proximate to each other, and at least of the first lenses are not proximate to each other.

10. The device of claim 9, wherein the first in-focus focal distance of the first camera is at or beyond a hyperfocal distance and the second in-focus focal distance of the second camera is less than the hyperfocal distance.

11. The device of claim 9, wherein each of the first lenses and each of the second lenses has a same focal length.

12. The device of claim 9, wherein:
- the first image sensors of the first camera and the second image sensors of the second camera are integrated on a same semiconductor wafer; and
- the first lenses of the first camera and the second lenses of the second camera are part of a same lens array, each lens of the lens array being aligned with a corresponding image sensor.

13. The device of claim 9, wherein the at least one processor is further configured:
- to divide each rectified first image and each rectified second image into segments and evaluate a sharpness of each segment; and
- to statistically set brightness in the unified image by giving greater weight to segments from rectified images containing sharp features than to segments from rectified images lacking sharp features.

14. The device of claim 13, wherein the at least one processor is further configured to statistically set color in the unified image, giving a less preferential weighting to segments from rectified images having sharp features than is used to statistically set brightness.

15. The device of claim 9, wherein the plurality of first image sensors comprises at least three first image sensors, and the plurality of second image sensors comprises at least three second image sensors.

16. A method comprising:
- capturing a plurality of images through an array of cameras, the array comprising a first camera with a first focal distance to capture a first image and a second camera with a second focal distance different from the first focal distance to capture a second image, the plurality of images comprising the first image and second image; and
- processing the plurality of images to create a single composite image using each of the images, comprising:
  - dividing each image of the plurality of images into segments;
  - evaluating sharpness of an image portion in each segment; and
  - statistically setting brightness in the single composite image by giving greater weight to segments containing sharp features based on the evaluated sharpness than to segments lacking sharp features,
- wherein each camera of the array of cameras comprises at least one image sensor paired with a corresponding lens, and each of the lens of the array of cameras has a same focal length.

17. The method of claim 16, wherein the cameras of the array of cameras each provide a substantially the same field of view and magnification.

18. The method of claim 16, wherein processing the plurality of images to create the single image further comprises statistically setting color in the single image, giving a less preferential weighting to segments having sharp features than is used to statistically set brightness.

19. The method of claim 16, each camera of the array of cameras comprises a red channel image sensor, a green channel image sensor, and a blue channel image sensor, the first camera comprising a first red channel image sensor paired with a first lens, a first green channel image sensor paired with a second lens, and a first blue channel image sensor paired with a third lens, and the second camera comprising a second red channel image sensor paired with a fourth lens, a second green channel image sensor paired with a fifth lens, and a second blue channel image sensor paired with a sixth lens,
- wherein capturing the first image includes correcting for disparities between images captured by the first red channel image sensor, the first green channel image sensor, and the first blue channel image sensor, and
- capturing the second image includes correcting for disparities between images captured by the second red channel image sensor, the second green channel image sensor, and the second blue channel image sensor.

* * * * *